United States Patent [19]

Ueba et al.

[11] Patent Number: 4,568,146

[45] Date of Patent: Feb. 4, 1986

[54] PLASTIC OPTICAL FIBER AND PRODUCTION THEREOF

[75] Inventors: Yoshinobu Ueba; Norifumi Matsumiya, both of Osaka, Japan

[73] Assignee: Sumitomo Electric Industries, Ltd., Osaka, Japan

[21] Appl. No.: 541,726

[22] Filed: Oct. 13, 1983

[30] Foreign Application Priority Data

Oct. 21, 1982 [JP] Japan ................. 57-185838
Jan. 11, 1983 [JP] Japan ................... 58-2975

[51] Int. Cl.$^4$ .............................. G02B 5/172
[52] U.S. Cl. .................. 350/96.34; 264/1.5; 428/394
[58] Field of Search ............. 350/96.29, 96.30, 96.34; 264/1.5, 171; 428/364, 378, 392, 394, 421, 422, 515–523, 918

[56] References Cited

U.S. PATENT DOCUMENTS 3,993,834 11/1976 Chimura et al. ......... 350/96.34 X
4,505,543 3/1985 Ueba et al. ............... 350/96.34

OTHER PUBLICATIONS

Oikawa et al., "Plastic Optical Fibre with Improved Transmittance," *Electronics Lett.*, vol. 15, No. 25, Dec. 1979, pp. 829–830.
Kaino et al., "Low Loss Poly(Methylmethacrylate-d8), Core Optical Fibers," *Appl. Phys. Lett.*, vol. 42, No. 7, Apr. 1983, pp. 567–569.

*Primary Examiner*—John Lee
*Attorney, Agent, or Firm*—Wenderoth, Lind & Ponack

[57] ABSTRACT

A plastic optical fiber which comprises a core consisting of an amorphous polymer containing a plasticizer and a cladding consisting of a transparent polymer which substantially prevents cross-migration of said plasticizer therein and has a refractive index lower than the core polymer, and which is preferably produced by a process which comprises heat polymerizing a monomer which is polymerized to afford said amorphous polymer and contains said plasticizer, a polymerization initiator and a chain transfer agent, melt spinning said amorphous polymer to form a core and simultaneously cladding the core with said transparent polymer.

14 Claims, No Drawings

PLASTIC OPTICAL FIBER AND PRODUCTION THEREOF

FIELD OF THE INVENTION

The present invention relates to a plastic optical fiber and production thereof. More particularly, it relates to a plastic optical fiber having good heat resistance and flexibility and a process for producing said optical fiber.

BACKGROUND OF THE INVENTION

Conventional plastic optical fibers, which are generally stretched in the course of the production, tend to shrink at a temperature higher than about 80° C. For example, when they are heated to a temperature of 120° C. for a very short period of time, for example several seconds, they shrink to about 50% of their original length.

The conventional plastic optical fiber is usually made of an amorphous polymer such as poly(methyl methacrylate) (hereinafter referred to as "PMMA") and polystyrene, and only stretching of the optical fiber can impart good mechanical properties such as flexibility and pliability to the optical fiber. Therefore, it has been believed to be impossible to avoid the shrinkage of the plastic optical fiber at a high temperature.

The present invention has been developed to overcome the above described drawbacks of the conventional plastic optical fibers and to provide a plastic optical fiber having good heat resistance and flexibility as well as good light transmission.

SUMMARY OF THE INVENTION

According to one aspect of the invention, there is provided a plastic optical fiber which comprises a core consisting of an amorphous polymer containing a plasticizer and a cladding consisting of a transparent polymer which substantially prevents cross-migration of said plasticizer therein and has a refractive index lower than the core polymer.

According to another aspect of the invention, there is provided a process for producing the plastic optical fiber in accordance with the invention which comprises heat polymerizing a monomer which is polymerized to afford an amorphous polymer and contains a plasticizer, a polymerization initiator and a chain transfer agent, melt spinning the amorphous polymer to form a core and simultaneously cladding the core with a transparent polymer which substantially prevents cross-migration of said plasticizer therein and has a refractive index lower than the core polymer.

DETAILED DESCRIPTION OF THE INVENTION

Specific examples of the amorphous polymer are PMMA, polystyrene, polycarbonate, deuterated PMMA, deuterated polystyrene, deuterated polycarbonate, copolymers containing methyl methacrylate (hereinafter referred to as "MMA"), homo- or copolymers of alkyl or aryl methacrylate.

The diameter of the core is usually from 0.01 to 5.0 mm.

The plasticizer should be compatible with the amorphous polymer of the core and absorb light as little as possible. In addition the closer the density and the refractive index of the plasticizer are to those of the core polymer, the more preferable.

Specific examples of the plasticizer are phthalates (eg. dimethyl phthalate, diethyl phthalate (hereinafter referred to as "DEP"), dipropyl phthalate, dibutyl phthalate, dihexyl phthalate, dicyclohexyl phthalate, diheptyl phthalate, dioctyl phthalate, diisooctyl phthalate, di(2-ethylhexyl)phthalate, butly benzyl phthalate, butyl octyl phthalate, dicapryl phthalate, diisodecyl phthalate, etc.), sebacates (eg., dibutyl sebacate, dioctyl sebacate, etc.), adipates (eg. dibutyl adipate, dicapryl adipate, di(2-ethylhexyl)adipate, etc.), azelates, benzoates (eg. diethylene glycol benzoate, etc.), maleates, fumarates, and phosphates (eg. tributyl phosphate, tricresyl phosphate).

The amount of the plasticizer to be contained in the core polymer varies with the kinds of the core polymer and of the plasticizer to be used and is preferably such an amount that the flexural modulus of the core is not more than $5 \times 10^5$ g/mm$^2$, preferably not more than $2.5 \times 10^5$ g/mm$^2$, in which range the optical fiber has excellent flexibility without stretching. For example, the core consisting of PMMA containing 5% or 15% by weight of DEP has flexural modulus of $4.5 \times 10^5$ or $1.4 \times 10^5$ g/mm$^2$ respectively. Further, since PMMA containing the plasticizer has a melt viscosity lower than PMMA not containing any plasticizer, the spinning temperature can be lowered and the deterioration of the polymer is prevented during heating. For example, the melt viscosity of PMMA containing 5% by weight of DEP is $3 \times 10^4$ poise at 190° C., while that of PMMA not containing any plasticizer reaches $3 \times 10^4$ poise at 240° C.

As the cladding of the plastic optical fiber in accordance with the invention, a transparent polymer which suffers less permeation or cross-migation of the plasticizer and has a lower refractive index than the core polymer is used. Specific examples thereof are poly(vinylidene fluoride), vinylidene fluoride/tetrafluoroethylene copolymer, vinylidene fluoride/tetrafluoroethylene/hexafluoropropylene terpolymer, fluorine-containing methacrylate polymer, fluorine-containing methacrylate/MMA copolymer, silicone resins, ethylene/vinyl acetate copolymer, etc. Although the thickness of the cladding of the conventional plastic optical fiber is 0.01 to 0.02 mm, that of the plastic optical fiber in accordance with the invention is preferably from 0.1 to 0.5 mm or more, because the thicker cladding not only prevents the permeation or cross-migration of the plasticizer at a higher temperature but also improves the strength of the optical fiber.

Preferably, the solubility parameter (hereinafter referred to as "SP") of the cladding polymer is smaller than the plasticizer, thereby the permeation or cross-migration of the plasticizer is effectively prevented. When the former is smaller than the latter by at least one, the permeation or cross-migration of the plasticizer is hardly observed. It is to be noted that the difference between SP of the core polymer and that of the plasticizer does not affect the light transmission in the core, even if they are so close.

SPs and the refractive indexes of the amorphous polymer, the transparent polymer and the plasticizer are listed in Tables 1, 2 and 3.

Each material to be used to produce the plastic optical fiber may be selected by referring to the physical properties listed in Tables 1, 2 and 3.

TABLE 1

| Core polymer | SP | Refractive index (n) |
|---|---|---|
| PMMA | 9.0–9.5 | 1.49 |
| Poly(ethyl methacrylate) | 8.95 | 1.485 |
| Poly(butyl methacrylate) | 8.75 | 1.483 |
| Poly(isobutyl methacrylate) | 8.7 | 1.447 |
| Poly(isobornyl methacrylate) | 8.1 | — |
| Poly(methyl acrylate) | 9.7 | 1.479 |
| Poly(ethyl acrylate) | 9.7 | 1.468 |
| Polystyrene | 8.6–9.7 | 1.59 |
| Polycarbonate | 10.6 | 1.585 |

TABLE 2

| Cladding polymer | SP | Refractive index (n) |
|---|---|---|
| Silicone resin | 7.3–7.4 | 1.40 |
| Poly(vinylidene fluoride) | 7.8 | 1.42 |
| Vinylidene fluoride/tetrafluoroethylene copolymer | 6.2–7.8 | 1.35–1.42 |
| Fluorine-containing alkyl methacrylate/MMA copolymer | 5.8–9.0 | 1.36–1.46 |
| Perfluoro-t-butyl methacrylate polymer | 6.0–7.0 | 1.36 |

TABLE 3

| Plasticizer | SP | n | b.p. (°C.) |
|---|---|---|---|
| Dimethyl phthalate | 10.4 | 1.513 | 283 |
| Diethyl phthalate | 9.9 | 1.500 | 298 |
| Dibutyl phthalate | 9.4 | 1.491 | 340 |
| Dicyclohexyl phthalate | 9.3 | 1.451 | 213–218/5 mmHg |
| Di(2-ethylhexyl) phthalate | 8.9 | 1.485 | 231 |
| Diisooctyl phthalate | 9.0 | 1.485 | 238–239/5 mmHg |
| Dicapryl phthalate | 8.9 | 1.479 | 215–240/5 mmHg |
| Diisodecyl phthalate | 8.6 | 1.484 | 255/5 mmHg |
| Butyl octyl phthalate | 9.1 | 1.484 | 340/740 mmHg |
| Butyl benzyl phthalate | 8.9 | 1.535 | 370 |
| Dicapryl adipate | 8.5 | 1.439 | 213–217/4 mmHg |
| Di(2-ethylhexyl) adipate | 8.5 | 1.446 | 214/5 mmHg |
| Diethylene glycol benzoate | 10.1 | 1.543 | 230–243/5 mmHg |
| Tributyl phosphate | 4.1 | 1.430 | 180–183° C./22 mmHg |
| Tricresyl phosphate | 5.7 | 1.554 | 265/5 mmHg |
| Dibutyl sebacate | 8.7 | 1.440 | 344–345 |

In Table 3, the boiling points of the plasticizers are also shown. Preferably, the plasticizer having the boiling point higher than 200° C. has such little volatility that it does not permeate or cross-migrate into the cladding or volatilize from the surface of the cladding.

The plasticizer may be blended in the core polymer by means of calendering rolls, a mixer, a screw extruder, etc. However, by these methods, the core polymer may be contaminated with optically foreign particles and it is difficult to assure satisfactory light transmission properties of the optical fiber. In addition, the difference between the viscosities of the amorphous polymer and the plasticizer is so large that the intermolecular mixing of these components is extremely difficult and that it takes longer time to mix them homogeneously.

In contrast to the above mixing methods, according to the process in accordance with the present invention, the core polymer is produced by polymerizing the monomer in the presence of the plasticizer, the polymerization initiator and the chain transfer agent. Thus, as far as these components are well purified before polymerization, the formed core polymer is much less contaminated with the foreign particles than the polymer obtained by the conventional mixing methods.

By the process in accordance with the invention, MMA, styrene, alkyl or aryl methacrylate, their deuterated derivatives and a mixture thereof are preferably polymerized.

Specific examples of the initiator are azo compounds such as N,N'-azobisisobutyronitrile (hereinafter referred to as "AIBN") and azo-t-butane, and peroxides such as t-butylperoxide. Specific examples of the chain transfer agent are mercaptans such as n-butylmercaptan and t-butylmercaptan.

These components are preferably mixed in a closed container.

Preferably, the mixture of the components is filtered, for example, through a porous polypropylene membrane having a pore size of 0.02 microns to eliminate the optically foreign particles. The filtered mixture is heat polymerized in a closed reactor to obtain a core polymer containing the plasticizer. A rod of the polymer is then ram extruded to form a core fiber. The cladding polymer may be co-extruded or may be coated on the core in the form of a solution of the cladding polymer or a melt. The plastic optical fiber is advantageously produced by a process disclosed in a copending application Ser. No. 539,677 filed on Oct. 6, 1983 claiming a convention priority based on the Japanese Patent Application No. 179443/1982, the disclosure of which is hereby incorporated by reference. Namely, the monomer composition containing the plasticizer, the polymerization initiator and the chain transfer agent is polymerized in a sealed cylinder under atmospheric pressure or elevated pressure, after the completion of the polymerization, the polymer is heated in the cylinder without removing it out of the cylinder to its melting point and spun by extruding it through a spinning head by a ram or with gaseous pressure to obtain the core.

The polymerization conditions such as temperature, pressure and polymerization time are substantially the same as those employed in the conventional procedure to polymerize the monomers.

The plastic optical fiber in accordance with the invention has advantages such that (i) it does not shrink when it is heated at a temperature of 80° C. or higher since it is not stretched during the production; (ii) it has good flexibility and pliability without stretching since the core contains the plasticizer; and (iii) the properties of the core do not deteriorate due to the cross-migration of the plasticizer, since the cladding is made of the polymer which substantially prevents cross-migation of the plasticizer therein.

Further, the process in accordance with the invention has advantages such that (i) the core polymer is produced in a closed system and is not contaminated with optically foreign particles since the monomer is polymerised in the presence of the plasticizer; and (ii) the core is optically homogeneous since intermolecular mixing of the amorphous polymer and the plasticizer is achieved.

The present invention will be hereinafter explained further in detail by following examples.

EXAMPLES 1 TO 3

PMMA (SP=9.2; n=1.490) and a plasticizer (25% by weight on the basis of the weight of PMMA) were mixed in an extruder and spun by extrusion to form a core. Simultaneously, a cladding polymer was co-extruded on the core to form a plastic optical fiber having the core of 0.5 mm in diameter and the cladding of 0.1 mm in thickness.

The plasticizer and the cladding polymer used in Examples are as follows:

EXAMPLE 1

Plasticizer: Diethyl phthalate (SP=9.9; n=1.500)
Cladding polymer: Vinylidene fluoride/tetrafluoroethylene copolymer (SP=7.5; n=1.40–1.41)

EXAMPLE 2

Plasticizer: Dibutyl phthalate (SP=9.4; n=1.491)
Cladding polymer: Poly(vinylidene fluoride) (SP=7.8; n=1.42)

EXAMPLE 3

Plasticizer: Diisooctyl phthalate (SP=9.0; n=1.485)
Cladding polymer: Perfluoro-t-butyl methacrylate polymer (SP=6.0; n=1.36)

The thus obtained optical fiber was heated at 120° C. for 10 minutes but hardly shrank.

COMPARATIVE EXAMPLE 1

In the same manner as in Example 1 but using PMMA not containing any plasticizer, an optical fiber was produced.

A optical fiber which was not stretched was poor in flexibility and broken when it was wound on its own diameter, and when it was bent on a mandrel of 5 mm in diameter, it broke after 10 times bending.

It was possible to impart flexibility to the optical fiber by stretching it but when it was heated at 120° C. for a very short period of time, it shrank more than 50% along its length.

COMPARATIVE EXAMPLE 2

In the same manner as in Example 1 but using glycerol monooleate as a plasticizer, an optical fiber was produced.

In the thus obtained optical fiber, the compatibiity of the plasticizer with the core polymer was poor, and the light transmission in the fiber was inferior.

EXAMPLES 4 TO 6 AND COMPARATIVE EXAMPLES 3 AND 4

A predetermined amount of MMA containing AIBN (0.01% by weight on the basis of the weight of MMA) and n-butylmercapran (0.3% by weight on the basis of the weight of MMA) was mixed with a predetermined amount of DEP in a test tube of 8 mm in diameter and polymerized by heating the mixture at 80° C. for 14 hours, at 100° C. for 1.5 hour and then at 130° C. for 4 hours.

TABLE 4

| Example | MMA (ml) | DEP (ml) | DEP content (wt %) |
|---|---|---|---|
| 4 | 9.6 | 0.4 | 5 |
| 5 | 8.7 | 1.3 | 15 |
| 6 | 7.4 | 2.6 | 30 |
| Comparative Example 3 | 10 | 0 | 0 |

The thus obtained polymer was removed from the test tube and spun at a extrusion temperature of 160° to 200° C. to obtain a core of 0.500 mm in diameter. As a cladding polymer, a 30% solution of vinylidene fluoride/tetrafluoroethylene copolymer in methyl ethyl ketone was applied on the core and dried to obtain a cladding of 0.028 mm in thickness.

In Comparative Example 4, a commercially available plastic optical fiber having a core made of PMMA was used.

Heat resistance (degree of heat shrinkage), flexibility (modulus) and light transmission (attenuation of light) of the plastic optical fibers were measured as follows:

Heat Resistance (Degree of Heat Shrinkage)

The optical fiber of 100 mm in length was kept in a thermostatic chamber kept at 120° C. for 60 minutes and the degree of shrinkage was measured.

Flexibility (Modulus)

The modulus was measured by means of an Instron tester.

Light Transmission (Attenuation of Light)

Attenuation of light of the optical fiber of 5 m in length was measured by utilizing He-Ne laser light (633 nm). The attenuation was calculated according to the following equation:

$$L = -\frac{10}{1} \log \frac{I}{I_0}$$

wherein
$I_0$ = strength of incident light
$I$ = strength of output light
$1$ = length of the optical fiber
The results are shown in Table 5.

TABLE 5

| | Degree of shrinkage (%) | Modulus (g/mm$^2$) | Attenuation (dB/m) |
|---|---|---|---|
| Example 4 | 4 | 2.0 × 10$^5$ | 0.5 |
| Example 5 | 5 | 1.4 × 10$^5$ | 1.0 |
| Example 6 | 7 | 8.6 × 10$^4$ | 2.6 |
| Comparative Example 3 | 4 | 3.0 × 10$^5$ | 0.3 |
| Comparative Example 4 | 49 | 3.5 × 10$^5$ | 0.4 |

COMPARATIVE EXAMPLE 5

PMMA and DEP (15% by weight on the basis of the weight of PMMA) were pelletized by means of a twin-screw extruder.

In the same manner as in Example 4 but using the pellets as a core polymer material, an optical fiber was produced. Attenuation of light of the thus produced optical fiber was 7 dB/m, and the light transmission of the optical fiber was unsatisfactory.

What is claimed is:

1. A plastic optical fiber which comprises a core consisting of an amorphous polymer containing a plasticizer and a cladding consisting of a transparent polymer which substantially prevents cross-migration of said plasticizer therein and has a refractive index lower than the core polymer and said plasticizer being contained in the amorphous polymer in such an amount that the flexural modulus of the core is not more than 5×10$^5$ g/mm$^2$.

2. The plastic optical fiber according to claim 1, wherein the solubility parameter of the cladding is lower than that of the plasticizer.

3. The plastic optical fiber according to claim 2, wherein the solubility parameter of the cladding is lower than that of the plasticizer by at least 1.

4. The optical fiber according to claim 1 wherein the plasticizer is contained in the amorphous polymer in such an amount that the flexural modulus of the core is not more than $2.5 \times 10^5$ g/mm$^2$.

5. The plastic optical fiber according to claim 1, wherein the thickness of the cladding is not less than 0.1 mm.

6. The plastic optical fiber according to claim 1, wherein the amorphous polymer is one selected from the group consisting of poly(methyl methacrylate), polystyrene, polycarbonate, deuterated poly(methyl methacrylate), deuterated polystyrene, deuterated polycarbonate, copolymers containing methyl methacrylate and homo- or co-polymers of alkyl or aryl methacrylate.

7. The plastic optical fiber according to claim 6, wherein the amorphous polymer is poly(methyl methacrylate).

8. The plastic optical fiber according to claim 1, wherein the plasticizer is one selected from the group consisting of dimethyl phthalate, diethyl phthalate, dipropyl phthalate, dibutyl phthalate, dihexyl phthalate, dicyclohexyl phthalate, diheptyl phthalate, dioctyl phthalate, diisooctyl phthalate, di(2-ethylhexyl)phthalate, butyl benzyl phthalate, butyl octyl phthalate, dicapryl phthalate, diisodecyl phthalate, dibutyl sebacate, dioctyl sabacate, dibutyl adipate, dicapryl adipate, di(2-ethylhexyl)adipate, diethylene glycol benzoate, tributyl phosphate and tricresyl phosphate.

9. The plastic optical fiber according to claim 8, wherein the plasticizer is diethyl phthalate.

10. The plastic optical fiber according to claim 1, wherein the transparent polymer of the cladding is one selected from the group consisting of poly(vinylidene fluoride), vinylidene fluoride/tetrafluoroethylene copolymer, vinylidene fluoride/tetrafluoroethylene/hexafluoropropylene terpolymer, fluorine-containing methacrylate polymer, fluorine-containing methacrylate/methyl methacrylate copolymer, silicone resins and ethylene/vinyl acetate copolymer.

11. The plastic optical fiber according to claim 1, wherein the transparent polymer of the cladding is poly(vinylidene fluoride) or vinylidene fluoride/tetrafluoroethylene copolymer.

12. The process for producing the plastic optical fiber according to claim 1, which comprises heat polymerizing a monomer which is polymerized to afford an amorphous polymer and contains a plasticizer, a polymerization initiator and a chain transfer agent, melt spinning the amorphous polymer to form a core and simultaneously cladding the core with a transparent polymer which substantially prevents cross-migration of said plasticizer therein and has a refractive index lower than the core polymer.

13. The process according to claim 12, wherein the monomer is one selected from the group consisting of methyl methacrylate, styrene, alkyl or aryl methacrylate, their deuterized derivatives and a mixture thereof.

14. The process according to claim 12, wherein the monomer containing the plasticizer, the polymerization initiator and the chain transfer agent is filtered through a porous membrane and polymerized in a closed system.

* * * * *